W. L. R. EMMET.
SHIP PROPULSION.
APPLICATION FILED MAY 29, 1920.
1,373,873.
Patented Apr. 5, 1921.
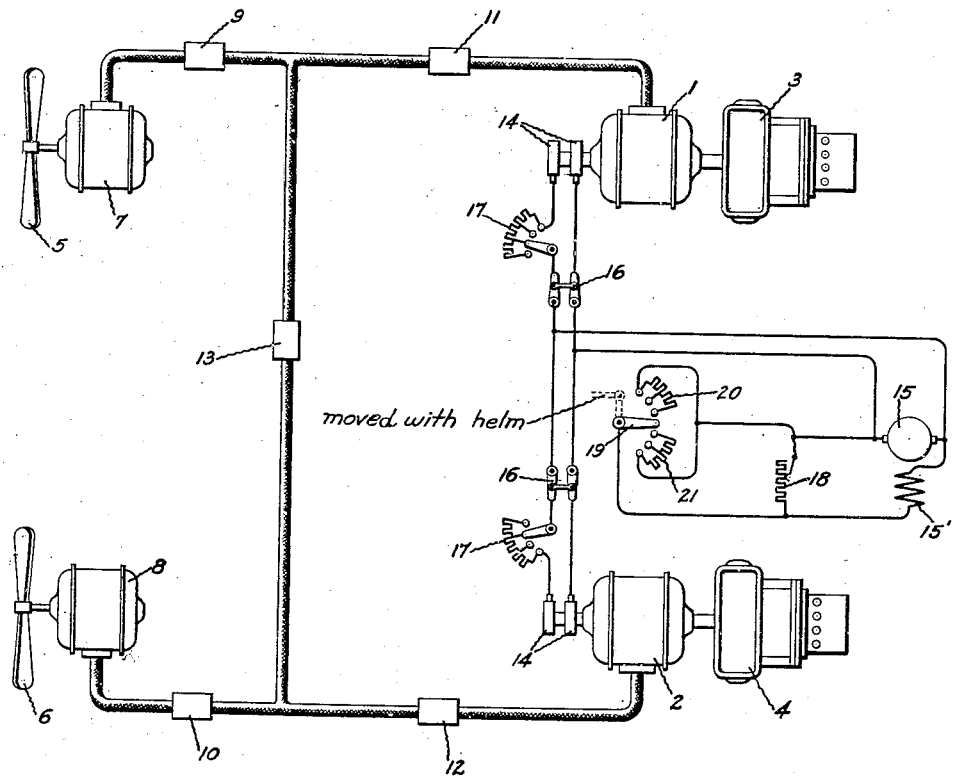
Inventor:
William L. R. Emmet,
by Albert G. Davis
His Attorney

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

SHIP PROPULSION.

1,373,873.  Specification of Letters Patent.  Patented Apr. 5, 1921.

Application filed May 29, 1920. Serial No. 385,343.

*To all whom it may concern:*

Be it known that I, WILLIAM L. R. EMMET, a citizen of the United States, residing at Schenectady, in the county of Schenectady, State of New York, have invented certain new and useful Improvements in Ship Propulsion, of which the following is a specification.

My invention relates to systems of electric ship propulsion and has for its principal object the provision of an improved combination of apparatus, whereby the efficiency of operation may be maintained at a high value without sacrificing stability and reliability of operation of the electric propeller driving motors.

My invention is more particularly concerned with systems of electric ship propulsion in which the propeller shafts are driven by alternating current motors receiving electrical energy from alternators driven by elastic fluid turbines, but in its broadest aspect my invention is not limited to any particular type of motor or prime mover.

When a ship having propellers on both sides is turned, the speed of the propellers when independently operated will vary, the propeller on the concave side of the turning curve moving slower and the propeller on the convex side moving faster. If the propellers are held at substantially the same speed, as is the case either where the prime movers driving the generators supplying the respective motors are held at constant speed by governors, or where the propellers on both sides are driven by alternating current motors supplied from the same generator, the variations of speed which would otherwise occur are prevented and the propeller or propellers on the concave side of the turning curve consequently take heavier loads than those on the convex side. Since the act of turning impedes the motion of the ship, the aggregate load on the prime movers will increase if the prime movers are held at constant speed. The variations of load under such conditions are very large and such variations of loads between the propellers may cause difficulties, which become particularly serious in equipments in which the propellers are driven by alternating current motors.

In an equipment for propeller driving motors of the induction type, such motors normally operate nearly in synchronism with the generator and can deliver their maximum torques only when near to synchronism. If the maximum torque of a propeller driving motor is exceeded by the torque demanded by the propeller the motor will drop out of step, that is, it will fall away from a speed near synchronism and will stop or operate at some lower speed, thus drawing a very large current from the generator and exerting a small torque upon the propeller. Such dropping out of step of a propeller driving motor on either side of a ship seriously hampers the control of the ship and the reëstablishment of normal operating conditions generally calls for intelligent action by the man handling the propelling machinery, and, since this may not be forthcoming in such an emergency, it is extremely desirable to provide means acting automatically to enable the propeller driving motor to supply the increased torque necessary for variations in load imposed by the operation of the steering mechanism of the ship.

In my U. S. Letters Patent No. 1,270,134 dated June 18, 1918, I have proposed automatic means by which the steering of the ship cannot impose a dangerously excessive torque upon any of the propeller driving motors. According to the present invention, I provide means for increasing the available motor torque to provide for the load variations imposed by the turning of the ship. As is well known to those skilled in the art, the torque capacity of an electric motor may be increased by increasing the voltage of the source of current supplying the motor. Where induction motors are used, the simplest way of providing an increased torque is to increase the excitation of the generator which supplies the motor. Where propeller driving motors of the synchronous type are used, stability of operation may be controlled by varying the excitation of either generator or motor, or both.

In an electrically propelled ship, the best electrical efficiency is obtained when the voltage of the generator is just sufficient to produce the necessary torque in the propeller driving motors. If the torque demand upon any motor is liable to sudden and large increases due to the turning of the ship, it becomes necessary to carry, normally upon the generator supplying such motor, a higher degree of excitation than that which is most efficient for normal straightaway operation. According to my invention, this undesirable condition is overcome by arranging the steering mechanism so that actuation thereof to turn the ship will increase the excitation of the generator while the helm is turned to any considerable angle.

My invention will be better understood from the following description taken in connection with the accompanying drawing and its scope will be pointed out in the appended claims.

The single figure of the drawing diagrammatically illustrates a ship propulsion system comprising turbine driven alternating current generators and alternating current propeller driving motors.

In the drawing, 1 and 2 represent alternating current generators driven by prime movers 3 and 4, which are represented as elastic fluid turbines. The turbines are assumed to be provided with any well known speed governing mechanism, a suitable type of governor being that shown in my U. S. Letters Patent, No. 1,137,308, dated April 27, 1915. The propellers 5 and 6 located on opposite sides of the ship are directly connected to alternating current motors 7 and 8. Reversing and circuit controlling switches 9 and 10 are represented in the leads to the respective propeller driving motors 7 and 8. Disconnecting switches 11 and 12 are represented in the mains leading from the generators 1 and 2 to the motor. A bus-tie switch is indicated at 13, and by these switches, generator 1 may be arranged to supply motor 7 and generator 2 may be arranged to supply motor 8, or both motors may be driven from either generator. The switches will preferably be interlocked so that it is impossible to connect the generators 1 and 2 in parallel. This arrangement of switches is disclosed and claimed in my U. S. Letters Patent No. 1,214,528, dated February 6, 1917. The generators 1 and 2 are represented as synchronous generators provided with slip rings 14 to which exciting current for the generator field windings is supplied from any convenient source, indicated as an exciter 15 provided with a field winding 15'. A switch 16 and a regulating rheostat 17 is represented in the excitation circuit of each generator.

In the arrangement illustrated, the exciter voltage is arranged to be controlled by an adjustable resistance 18. A contact arm 19, coöperatively connected in any suitable way to the steering mechanism for the ship, is arranged to connect resistors 20 or 21 in parallel with the resistance 18 whenever the helm is moved to an extent sufficient to impose a substantially different load upon either of the propeller driving motors. As indicated in the drawing, continued movement of the contact arm 19 may be arranged progressively to reduce the resistance in parallel with resistance 18 finally short circuiting the same. As thus arranged, the voltage of the exciter and the excitation of the generators 1 and 2 will be increased in proportion to the turning movement imparted to the helm. In this way, the torque characteristics of the propeller driving motors are varied so as to provide an increased torque capacity to cope with any increased load due to the turning movement of the ship.

It is apparent that my invention is not limited to the particular arrangement shown for increasing the excitation of the generators when the helm is moved. My invention contemplates any well-known means for increasing the excitation whether such means is applied to the exciter or directly to the generator excitation circuits or to an excitation controlling booster. It is apparent that resistors 20 and 21 may be controlled in either one or a plurality of steps and either directly or through the intervention of relays. It will also be understood, by those skilled in the art, that the movement of the arm 19 may be arranged to control the circuit of an extra field winding for the exciter 15, which winding may be either a shunt winding or a winding supplied from any convenient source.

It is furthermore obvious to those skilled in the art that in its broadest aspects my invention is not limited to excitation control for varying the capacity of the motors but covers broadly the principle of affecting the electrical system in any way so as to vary the torque characteristics of the motors in accordance with the position of the helm.

While I have particularly described my invention in connection with synchronous generators and induction motors, my invention is not limited to this particular type of electric propulsion system. The torque that a synchronous motor can exert without falling out of step may be controlled by varying the excitation of the system either at the motor or generator or at both motor and generator, and it will be understood that my invention is also applicable to ship propulsion systems comprising propeller driving motors of the synchronous type.

It is evident from the foregoing description that many modifications and variations may be made within the scope of my invention and I intend in the following claims to cover all such modifications and variations as fall within the spirit of my invention.

What I claim as new and desire to secure by Letters Patent of the United States, is:—

1. An electric ship propulsion system wherein an electric generator is arranged to supply power to an electric motor arranged to drive a propeller and wherein the load on said propeller driving motor tends to make the motor fall out of step when the helm is thrown to change the course of the ship, characterized by the fact that means are provided for controlling the motor torque characteristics in accordance with the helm position.

2. A system of electric ship propulsion comprising a propeller on each side of the ship, an electric motor arranged to drive each propeller, generating means arranged to supply current to said motors, and means for controlling the excitation of the generating means in accordance with the position of the helm.

3. A system of electric ship propulsion, comprising an alternating current generator, a propeller on each side of the ship, an alternating current motor coupled to each propeller and adapted to be electrically connected to said generator, and means coöperatively related to the steering mechanism for affecting the system to control the torque characteristic of the motors to keep them from falling out of step when the helm is thrown substantially to alter the course of the ship.

4. A system of electric ship propulsion comprising a propeller on each side of the ship, an induction motor arranged to drive each propeller, an alternating current generator arranged to supply current to each of said motors and means for increasing the generator excitation when the helm is thrown to change the course of the ship.

In witness whereof I have hereunto set my hand this 28th day of May, 1920.

WILLIAM L. R. EMMET.